Feb. 7, 1967 M. W. HEWETT ET AL 3,303,340
OPTICAL ARRANGEMENT IN HOT BOX DETECTION APPARATUS
Filed Oct. 25, 1963 2 Sheets-Sheet 1

INVENTORS
MAJOR W. HEWETT
LAWRENCE L. MEYER
BY *Isidore Match*
THEIR ATTORNEY

Feb. 7, 1967   M. W. HEWETT ET AL   3,303,340
OPTICAL ARRANGEMENT IN HOT BOX DETECTION APPARATUS
Filed Oct. 25, 1963   2 Sheets-Sheet 2

INVENTORS
MAJOR W. HEWETT
LAWRENCE L. MEYER
BY Isidore Match
THEIR ATTORNEY

United States Patent Office 3,303,340
Patented Feb. 7, 1967

3,303,340
OPTICAL ARRANGEMENT IN HOT BOX
DETECTION APPARATUS
Major W. Hewett, Charlotte, N.C., and Lawrence L. Meyer, Houston, Tex., assignors to General Electric Company, a corporation of New York
Filed Oct. 25, 1963, Ser. No. 319,006
3 Claims. (Cl. 246—169)

This invention relates to devices for inspecting railroad equipment. More particularly, it relates to arrangements for the detecting of overheated journal boxes, i.e., so-called "hot boxes."

With the average length of non-stop runs for railroad rolling stock being continually extended and with the progressively increasing speeds at which such longer runs are being made, the opportunities for frequency inspection of journal boxes once afforded by the greater amount of stops at more closely spaced division points have greatly decreased. Concomitantly, these higher speeds and longer runs have created an increasingly severe working environment for the journal bearings on rolling stock. Furthermore, economic pressures to which railroads have been subjected have caused a reduction in the personnel employed by railroads for journal box inspection purposes. The railroads have, therefore, adopted methods for the detection of overheated journal boxes while trains are moving at high speeds, such apparatus permitting the existence of a greater spacing of stop points while maintaining the necessary high levels of safety during long non-stop runs at high speeds.

The aforesaid apparatus has generally involved the utilization of noncontacting arrangements for determining journal box temperature, a particular apparatus for this purpose detecting the different quantities of infrared radiation emitted by the surface of a journal box as a result of the changing temperatures thereof. Such detectors have generally employed for this purpose an infrared radiation detecting element such as a bolometer as well as other infrared sensitive devices. The detecting element has operated in association with a suitable optical system which has functioned to focus the infrared radiation. The amount of infrared radiation detected from a journal box surface is an indication of its temperature and has been widely adopted as an index to the temperature of the journal bearing itself.

In making the required observations, heretofore, it has been most preferred to locate the detecting element and its associated optical system as close as is possible to the path of travel of the journal boxes under inspection. This is desirable in order to increase the amount of infrared energy intercepted by an optical system of fixed dimension and to reduce the possible errors in temperature measurement which may be introduced by such extraneous phenomena as dust swept up in the slipstream of a moving train, rain, swirling snow, etc. However, the protection of railroad employees and equipment requires that any object located near railroad tracks conform to generally adopted clearance requirements. Of necessity, the latter requirements restrict the height at which the detection apparatus may be mounted since equipment which projects above such height may result in injury to the workers at the sides of railroad cars and locomotives or damage to the apparatus.

Another factor which determines the location of the detection apparatus is the selection of the portion of the journal box or other portions of a railroad car, truck, and wheel assembly which is to be used as a target. The ultimate area of interest is the interface of the bearing and journal as it is here where any defect which may exist appears and manifests itself by generating heat. Of course, this interface is not exposed such that it may be inspected directly. Therefore, it has been necessary to ascertain what external portions of the journal box or other portions of the truck and wheel assembly which are visible have temperatures which provide a reliable index of the temperature of the aforesaid interface. As a result of studies made by some railroads, it has been determined that one of the more desirable targets for a hot-box detector is the side of a journal box. The sides of the journal box are desirable because they have good mechanical contact with the aforesaid interface whereby thermal conduction is good, and because they are physically located near the interface. The close physical location presents the advantage that the difference in temperature between the target and the interface (the heat source) due to heat losses is held down.

When a detector is located to conform with the clearance requirements and the optical axis of its associated optical system intercepts the path of the sides of the passing journal boxes of the cars of a moving train, the projection of the axis intercepts the underside of the passing cars. Since the undersides may vary widely among themselves in temperature as is readily appreciated when there are considered the different structures and functions of the large variety of types of railroad cars in use such as box cars, flat cars, hopper cars, etc., and the effect thereon, for example, of the prolonged exposure to the summer sun or other weather and meteorological phenomena, etc.; consequently, the underside of a car presents a widely and uncontrollably varying background against which the delicate determination of journal box temperature variations have to be made. Furthermore, special type cars and/or special type conditions for loading may exist, such as, for example, tank cars which may have very little overhang outward from the tracks or only an open catwalk and which may, on occasion, be filled with substances which require that they be kept hot to remain in the liquid state.

For a hot-box detecting system to accomplish its function, i.e., detecting journal box temperature and only journal box temperature, a salient point in the functioning of the system is that the indication of heat energy which is the output of the system is an indication of the heat of the journal box and not of any other heat radiating source. The detecting apparatus used provides an indication of the heat of the journal box by producing an electrical signal which represents the difference between the box heat and the heat of some reference or ambient. The apparatus presently in use which is located so as to scan the side of the journal box is constructed so that the infrared sensitive element has a portion which is continually exposed during the period of train passage; consequently, when the element is not focused on the side of a journal box, it is exposed to extraneous radiation including that from the underside of the cars. The result is that the heat indications produced by the apparatus are a representation of the difference between the box heat and the heat of the extraneous source including the undersides of the cars which, therefore, constitute the reference. It can be readily appreciated that with the various types of cars utilized, the types of freight hauled, the types of weather conditions encountered, and the types of other structures in the vicinity of the journal box that the underside of a car should not be used as a difference background, i.e., an "ambient" temperature reference, the temperature excursions from which indicate the temperature excursions of a journal box. To insure that the detection system is accomplishing its stated aim, it is desirable to prevent the underside of a car from influencing the operation of the detecting element and a more constant and reliable reference has to be utilized in its stead.

In the application of Corbin Dixon for Journal Box

Detection Apparatus, Serial No. 267,523, filed March 25, 1963 and assigned to the same assignee of this application, there is disclosed an efficacious hot box detection apparatus wherein a high speed shutter located at a point in the optical axis of the optical system in the hot box detection apparatus which is mounted near the ground prevents the infrared detection element therein from being subjected to any infrared radiation aimed thereon from above other than when the shutter is opened at the time that the axis of the optical system intercepts a journal box on a passing railroad vehicle. The shutter also functions to furnish a constant and reliable ambient reference temperature for the detecting element when the shutter is in the closed position. In this arrangement, the shutter is located between the lens arrangement comprising the optical system and the detecting element.

The lens consists of a material such as germanium which is substantially opaque to visible light and substantially transparent to infrared radiation. The detecting element is housed in a structure which contains a window located in registration with the shutter and the detecting element. Consequently, when the shutter is actuated to the open position to permit the infrared radiation from a passing journal box to be focused on to the detecting element, such radiation must pass through both the lens and the window before it impinges on the detecting element, both the lens and the window operating to attenuate such infrared radiation about equal amounts. When the shutter is in the closed position, the radiation from its back surface functions as a reference radiation and the latter radiation only has to pass through the window to impinge on the detecting element. Consequently, it is seen that in the apparatus of the aforesaid application, the radiation from the journal box required to produce a signal excursion from the reference signal to indicate journal box temperature is attenuated twice as much as the reference radiation.

In the aforesaid application, it is brought out that the shutter desirably operates at as high a speed as is possible and operates equally fast in going from the open to the closed and in going from the closed to the open positions. However, since it is located on the optical axis of the optical system intermediate the lens arrangement and the detecting element, of necessity, it is located in the path of converging radiation lines and, as such, in going from one to the other position, it must at least move a distance equal to the area of the converging radiation at the point that it is positioned. This results in reduced speed of shutter operation since there is a relatively substantial minimum time required to open and close the "line of sight," due to the fact that the total converging line area has to be swept.

The signal excursions in the aforesaid application are amplified in an A.C. coupled amplifier. To achieve an efficient impedance match between a bridge which is unbalanced by the output of the detecting element and the input to the amplifier, it may be desirable to maintain the detecting element at a chosen minimum temperature. Quite often this may require a separate heating source for heating the detecting element, such heating source being contained in the mounting for the detecting element housing. In an arrangement where the shutter is disposed between the lens means and the window of the detecting element housing, the shutter, of necessity, is physically located quite close to such separate heating source and consequently its temperature may be raised above the ambient temperature. Since the back of the shutter when it is in the closed position serves as the ambient temperature reference, the influencing of its temperature by the aforesaid heating source may result in a reference signal which is not sufficiently distinct from the signal excursions which indicate journal box temperature.

It is accordingly an important object of this invention to provide an optical system associated with a high speed shutter in hot box detecting apparatus wherein the shutter serves to provide an ambient reference which effects an improved and advantageous attenuation ratio between the radiation from the passing journal boxes and the reference radiation from the shutter.

It is a further object to provide an optical system in accordance with the preceding object wherein the distance that the shutter has to travel in going from the open to closed and from the closed to open positions is greatly reduced.

It is another object to provide an optical system in accordance with the preceding objects wherein the shutter may be so located that its temperature is substantially uninfluenced by a heating source surrounding the detecting element housing.

In accordance with the invention, there is provided in an arrangement for detecting overheated journal boxes in which heat energy emitted by the boxes is focused onto an infrared sensitive element to provide respective signals therefrom indicative of the temperatures of the boxes, an optical system associated with the detecting element comprising a number of lenses substantially opaque to visible light but capable of transmitting infrared, in parallel arrangement. The lenses are spaced from each other a distance such that the infrared radiation incident on a first lens is focused thereby at a point between it and a second lens, the second lens refracting the radiation incident thereupon from this point back to parallel rays. A third lens is disposed between the second lens and the detecting element for receiving the parallel rays from the second lens and spaced a focal length from the detecting element for focusing the received rays on the element. A high speed shutter is positioned at the focal point between the first and second lenses, and is opened only when a side of a journal box in a moving train is intercepted by the optical axis of the detecting system.

The novel features, which are believed to be characteristic of this invention are set forth with particularity in the appended claims. The invention itself, however, both as to its organization and method of operation together with further objects and advantages thereof, may best be understood by reference to the following description when taken in connection with the accompanying drawings.

In the drawings, FIG. 1 is a diagrammatic illustration of a "hot box" detection apparatus employing the optical system of this invention;

Figure 1:
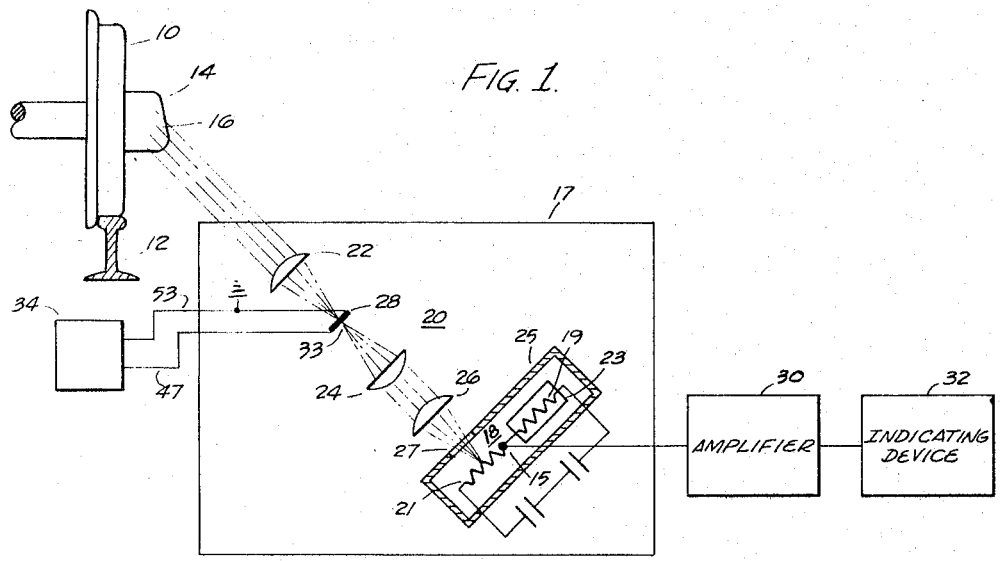

Referring now to FIG. 1, the structure 10 depicts the conventional railroad car wheel on a rail 12. The journal box 14 is located on the outside of the wheel beyond the gauge line of the track and encloses the journal bearing and axle, the sides of the journal box being generally of a rectangular configuration. When the journal bearing contained in the box becomes heated, the sides thereof such as a side 16 also become heated and consequently radiate infrared energy.

This infrared radiation is sensed by the detecting apparatus which is suitably positioned adjacent the track and mounted so that it can monitor the journal boxes on the cars of a moving train. The detecting apparatus functions to provide an indication as to whether the temperature of the journal bearing in a box has reached a level beyond a safe limit.

The detecting apparatus includes a housing 17 which has suitably positioned therein a heat energy detecting element 18 such as a thermistor bolometer or other type of infrared detector. Associated with element 18 is an optical system generally designated by the numeral 20. As will be further explained hereinbelow and in accordance with the principles of the invention, the optical system may comprise the lenses 22, 24 and 26 which consist of a material such as germanium which is opaque to visible light but transparent to infrared radiation, and a shutter 28 located intermediate lenses 22 and 24. Shutter 28 is constructed to have as high an operating speed as is possible, i.e., its time for going from the closed to the open position and from the open to closed positions are both of extremely short duration, on the order of about one to two milliseconds.

Detecting element 18 comprises two like portions 19 and 21, portion 19 being contained in a radiation shielding housing 23, both portions being contained in a housing 25. A window 27 consisting of a material similar to the material comprising lenses 22, 24 and 26 is provided in housing 25 intermediate lens 26 and detecting element portion 21. It is seen that with this arrangement, portion 19 is shielded from any radiation at all times and that portion 21 is in the quiescent state (with shutter 28 in the closed position) exposed to that portion of the radiation emitted from the back of shutter 28 which passes through lenses 24 and 26 and window 27.

Portions 19 and 21 suitably comprise two legs of a bridge circuit. With shutter 28 in the closed position, the voltages across portions 19 and 21 are such as to be substantially equal and to oppose each other whereby a substantially steady state null signal is provided at point 15. In this connection, it is to be realized that shielded portion 19 is substantially constantly at about the temperature present within housing 25. Shutter 28 may be at this temperature or at one below or above it. However, to the extent that its temperature, i.e., the infrared radiation from its back surface passing through lenses 24 and 26 and window 27 influences the conductivity of portion 21, it is a steady state voltage. Thus, when shutter 28 is actuated to the open position to expose only portion 21 to a passing journal box side, the signal appearing at point 15 is an excursion from the null signal, such excursion, of course being caused by the decrease in resistivity in portion 21 upon exposure to a greater amount of radiation than that from shutter 28 and the consequent unbalancing of the bridge.

This excursion, i.e., signal, is amplified in a suitable amplifier 30 and the output of amplifier 30 may be utilized to actuate an indicating device 32 such as a pointer on a chart, etc. Alternatively the output of amplifier 30 can be compared with a reference voltage which represents a safe temperature and any voltage difference in a given direction resulting from such comparison may represent a temperature of a journal box which is "hot," i.e., above a safe limit. Such difference voltage can be utilized to actuate an indicating or annunciating device which may be a visual or auditory alarm such as a red light, a bell, etc.

For actuating the shutter, i.e., synchronizing its opening with the moment that the optical axis of the optical system intercepts the portion of the journal box face 16 which is to be scanned, there may be utilized the well known wheel pickup arrangement generally designated by stage 34. Such wheel pickup may consist of a permanent magnet which establishes a magnetic field and a coil of wire to sense changes in this field. This pickup is positioned adjacent to the track. As the wheel approaches pickup 34, the wheel flange changes the reluctance of the magnetic path so that a first voltage is induced in the coil in one direction to produce a first signal. Then, as the wheel passes, the voltage swings sharply in the opposite direction to produce a second signal and then drops back to zero as the wheel moves away. It is this first signal which may be amplified and shaped, if necessary, which is utilized to actuate the shutter to the open position whereby the surface of the side of the journal box to be scanned falls into view on portion 21 of detecting element 18. The second signal then actuates the shutter back to the closed position. Since such pickups are well known in the art, no further description thereof is deemed necessary.

It is to be realized that the arrangement of FIG. 1 may readily be elaborated within the known background of the "hot box" detector art to provide synchronization, counting schemes, etc., and thereby to insure the production of information which can make known to a human monitor, the presence of an unsafe journal bearing temperature.

Figure 2:
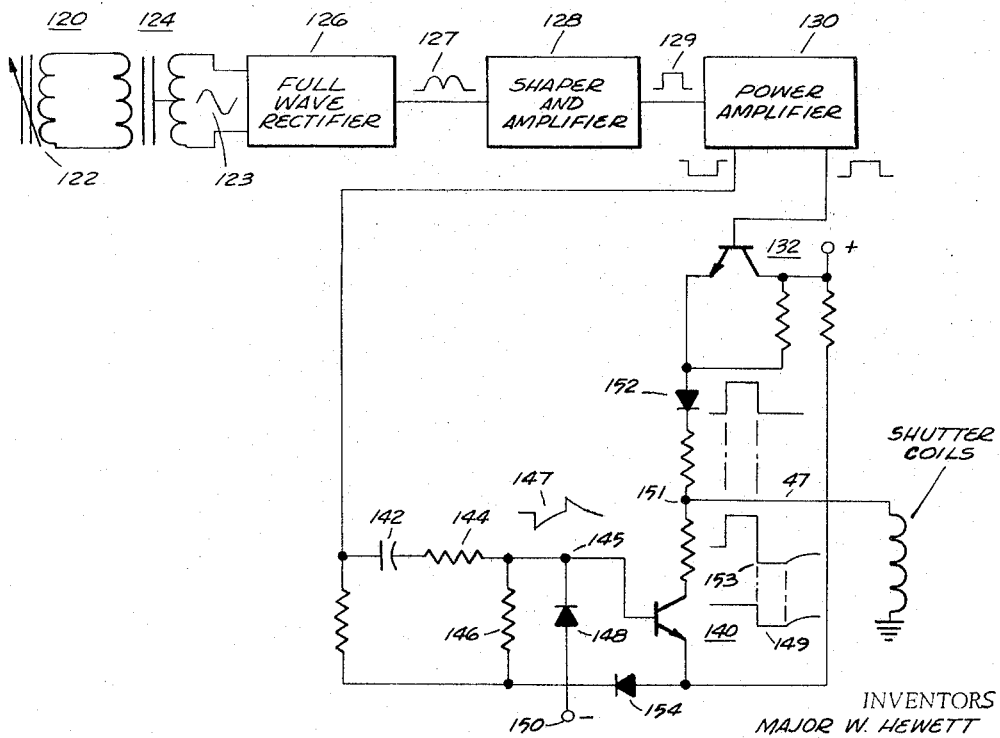
FIG. 2 is a schematic depiction of an illustrative embodiment of the wheel pickup operatively associated with the shutter of the arrangement of FIG. 1.

In FIG. 2 wherein there is shown an illustrative embodiment of the wheel pickup arrangement 34, FIG. 1, a magnetic pickup device 120 is included which senses the presence of a train wheel by providing a suitably located air gap in a magnetic circuit. Such circuit produces a flux change in response to the reluctance change caused by the presence of the train wheel in the vicinity of the air gap. This flux change is detected by a coil 122 linking the magnetic path and thus producing an induced voltage signal, such signal substantially having the configuration of a cycle of a sinusoidal wave, i.e., having a positive going portion and a negative going portion as shown at 123. The signal is applied to a full wave rectifier 126 through a transformer 124, the full wave rectified output of rectifier 126 having the shape of the signal shown at 127. This signal is shaped to a substantially rectangular pulse and amplified in a shaper and amplifier stage 128 to produce a positive rectangular signal as shown at 129. The output of stage 128 is power amplified in a power amplifier stage 130 which provides a double ended output having like positive and negative pulses. The positive pulse is applied as an input to a transistor 132 connected as an emitter follower whereby at the emitter of transistor 132 there is produced a current amplified positive pulse. The negative pulse output of power amplifier 130 is applied to a transistor 140 through a differentiating circuit comprising a series connected capacitor 142 and resistor 144, and a parallel connected resistor 146. Consequently, at junction point 145, there appears the signal shown at 147 resulting from the differentiation of the negative pulse output of power amplifier 130. The cathode to anode path of a diode 148, connected between the base of transistor 140 and negative potential source 150, functions to clip the negative going portion of signal 147 whereby there is applied to transistor 140 only the second half, i.e., the positive going portion of the latter signal. Transistor 140 has biasing potentials applied thereto such that it operates substantially in the saturated mode. Consequently, at the output of the collector of transistor 140, there is produced the pulse having the configuration such as shown at 149. The output appearing at the emitter of transistor 132 and at the collector of transistor 140 are combined at junction point 151 to produce the signal shown at 153. This is the signal which is applied to the coils of the shutter arrangement to cause the shutter blade first to move in one direction and then to move in the opposite direction. Diode 152 is included to remove any negative component at the output of the emitter of transistor 132 and diode 154 is included to negatively clamp the potential at the emitter of transistor 140 to the potential from negative source 150. The lead from junction 151 may correspond to lead 47 in FIG. 1.

Figure 3:
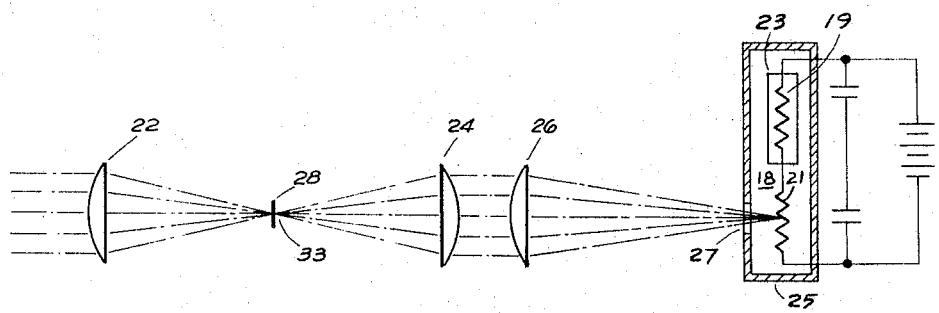
FIG. 3 is a diagrammatic depiction of a shutter and optical system combination constructed in accordance with the principles of the invention.

Referring now to FIG. 3 wherein there is shown an illustrative embodiment of the optical arrangement of this invention, the optical system thereof comprises three like lenses 22, 24 and 26 which may be plano-convex, meniscus, or the like. Lenses 22, 24 and 26 may suitably consist of germanium having a duplex coating thereon comprising a zinc sulfide undercoat and a magnesium fluoride overcoat. Lenses 22 and 24 are disposed such that their plane faces oppose each other, these faces being in parallel arrangement and spaced from each other. The spacing is so chosen that parallel rays radiated from a journal box side and incident on lens 22 are focused thereby at point 33, point 33 being located midway between the opposing faces of lenses 22 and 24. Lens 24 receives the rays which have passed through point 33 and refracts them so that they leave lens 24 again in parallel. Lens 26 whose convex face is spaced from and opposes the convex face of lens 24 has incident thereupon the parallel rays leaving lens 24 and again focuses the rays incident thereon onto portion 21 of detecting element 18 through window 27. The shutter 28 is located at point 33 and detecting element portion 21 is located in the plane of the focal point of lens 26.

With the optical arrangement shown in FIG. 3, several advantages are presented. Thus, shutter 28 can be positioned at point 33 rather than in the path of the converging rays leaving lens 26. It is readily apparent in this arrangement that since shutter 28 is located in the plane of the focal point of lens 22, it has a much smaller distance to travel when it is actuated to open the line of sight of the optical system than it would have if a single lens means were used. In a single lens arrangement, the shutter would have to be placed between a lens such as lens 26 and detecting element portion 21 where it would have to intercept all of the converging rays leaving lens 26. To open the line of sight in such arrangement, the shutter would have to sweep a much greater area. Accordingly, much greater speeds of shutter operation than have heretofore been possible is enabled by the arrangement of FIG. 3.

A second advantage presented by the arrangement of FIG. 3 occurs when detecting element 21 is of the thermistor bolometer type. Because, for reasons of efficiency (the signal from the detecting element is quite small to begin with), it is desired to get as good an impedance match as is possible between the output impedance of the detecting element bridge and the input impedance to an amplifier such as amplifier 30 (FIG. 1), quite often the bolometer itself has to be heated to a minimum temperature, such heating being accomplished by a separate heating arrangement (not shown) disposed around housing 25. It is appreciated that the farther away from the heating source for the bolometer that the shutter can be located, the less likely is the temperature of the shutter to rise above the actual ambient temperature. This is to be contrasted with the situation in which the shutter has to be located much closer to the adjacent bolometer when it is disposed between a single lens and the housing.

A third advantage that results from the arrangement of FIG. 3 is the fact that the difference between the infrared energy reaching the detecting element from the journal box when the shutter is in the open position and the energy reaching the detecting element from the ambient reference provided by the back of the shutter in the closed position is greatly enhanced. This can be understood when it is realized that the lenses are not quite perfect transmitters of infrared radiation and that with the three lens system of FIG. 3, detecting element portion 21 is, in its steady condition, i.e., quiescent state, subjected to the ambient heat energy from the back of the shutter 28 through lenses 24 and 26 and the window 27 of housing 25 and is subjected to the infrared energy from the journal box through all three of the lenses, viz., lenses 22, 24 and 26, and window 27. Consequently, the infrared radiation from the journal box impinging upon portion 21 is attenuated only 25 percent more than the radiation from the shutter impinging on portion 21, i.e., an attenuation ratio of four to three. By contrast, where a single lens would be used and with the shutter necessarily located between the lens and the detecting element, the ambient reference radiation energy from the shutter would impinge on the detecting element through the housing window and the radiation from the journal box would be incident upon the detecting element through a path comprising the lens and the window. Consequently, the radiation from the journal box would be attenuated twice as much as the radiation from the back of the shutter, an attenuation ratio of two to one.

Figures 4, 5, 6:
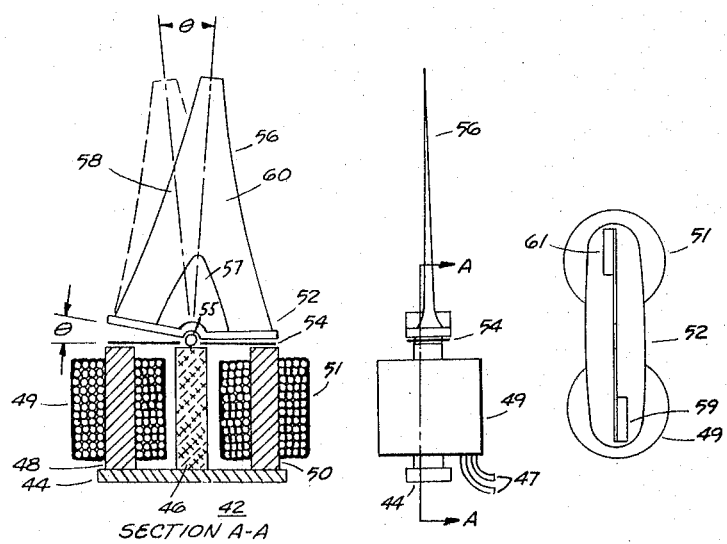
FIG. 4 is a side elevational view of an illustrative embodiment of a shutter arrangement suitable for use with the arrangement of FIG. 3.
FIG. 5 is a sectional view taken along the lines A—A of FIG. 4.
FIG. 6 is a plan view of the shutter arrangement of FIG. 4.

In FIGS. 4 to 6, there is shown an illustrative embodiment of an arrangement which may be utilized as shutter 28 of FIGS. 1 and 2. (This is the shutter arrangement depicted in FIGS. 3 to 5 of the hereinabove referred to Dixon application.)

Referring now to FIG. 4, the arrangement comprises an actuating element which comprises a pole structure 42 which includes a rectangular base 44 to which there are affixed and disposed in vertical parallel array, a centrally disposed rectangular pole 46 which consists of a permanent magnetic material and lateral poles 48 and 50. Poles 48 and 50 are the pole pieces for coils 49 and 51, permanent magnet 46 being located in the space between the outer circumferential surfaces of coils 49 and 51. The actuating signals to coils 49 and 51 may be provided, for example, on lead 47 which may be from pickup 34 to shutter 28 in the arrangement of FIG. 1.

The armature 52 which is caused to travel by the actuated electromagnets comprises a structure which is quasi-rectangular in its plan aspect, i.e., slightly octagonal as shown in FIG. 6. In its elevational aspect, it is slightly V shaped, the angle of the V being a little less than 180°. A shim 54 which suitably consists of a nonmagnetic material is disposed between the upper ends of poles 48, 46 and 50 to provide a desired reluctance gap between armature 52 and the pole pieces and also to absorb some of the impact energy produced by movement of the armature. Thereby, any tendency for the armature and the shutter blade to bounce is minimized. A bearing is disposed in the center of shim 54 and affixed to pole 46, a concave notch 55 in armature 52 permitting the shutter to travel to and fro on this bearing.

The shutter blade 56 consists of a thin sheet, approximately one thousandth of an inch thick, of an infrared opaque material which is stippled or embossed to enhance its stiffness. To lighten its weight, it may also be foraminated and/or flanged. Shutter blade 56 may be of a truncated triangular configuration with a relatively narrow apical angle. A triangular notch 57 may be provided in its base to enable a still further weight reduction thereof. As seen in FIG. 6, tabs 59 and 61 are provided affixed to or integral with legs 58 and 60 respectively to enable the attachment of shutter blade 56 to armature 52. Such attachment may be made by soldering, welding, or other known suitable metal or other bonding techniques.

In the operation of the shutter arrangement of FIGS. 4 to 6, the actuation of the electromagnetic structure comprising coils 49 and 51 and their associated pole pieces 48 and 50 causes movement of armature 52 and consequently movement of shutter blade 56. The armature, when caused to move, travels an angular distance equal to angle $\theta$. Consequently, the apical portion of shutter blade 56 also moves angularly an amount equal to angle $\theta$ but since the arms of its angle of movement are much longer than that of half of armature 52, the actual distance traveled by this apical portion is several times the distance traveled by armature 52, the multiplication factor being a function of the length of shutter blade 56 and the length of half of armature 52. Thus, if the total angular armature movement at an end is from $\frac{1}{32}''$ to $\frac{1}{16}''$, for example, and if the shutter blade is four times the length of half of the armature, then, the apical end of shutter blade 56 moves from $\frac{1}{8}$ to $\frac{1}{4}$ of an inch. The value of angle $\theta$ depends upon the value of the V angle of the armature, the thickness of shim 54 and the heights of poles 48 and 50. The dotted outline of shutter blade 56 in FIG. 5 shows it in the opposite position at the termination of armature movement. Once blade 56 has terminated its movement, permanent magnet 46 serves to keep it latched in this terminal position.

The shutter arrangement of FIGS. 4 to 6 may be designated as an impulse actuated bistable element which utilizes a permanent magnet to produce and maintain the magnetic field required to anchor the armature once it has completed its travel upon actuation. This shutter arrangement presents the following advantages:

(1) The time of transfer or travel is the same in either direction. There are no springs required which have to be compressed and thereby to absorb any of the energy which is utilized to drive the shutter in the area subtended by the optical system. It is, of cource, realized that springs may be included to stabilize the bringing of the shutter blade to a rest position substantially at its terminus of travel in a given direction once it has moved out of such subtended area. Shim arrangement 54 may function as such stabilizing spring. This permits the amount of work done by the shutter to be substantially entirely dependent on an electrical driving signal.

(2) External electrical power is required only for its actuation. The shutter means may be constructed to have a design point transfer time which is less than one millisecond and since its movement is essentially due to snap or toggle action, the time of external actuation may be much less than its transfer time. The permanent magnet exerts a considerable force on armature 52 to prevent its moving because of vibration and shock and consequently no external holding power is required.

(3) Because no external magnetic field has to be established or other force provided, the speed of operation is determined essentially by the mass of the armature 52, shutter blade 56 and the inductance of actuating coils 49 and 51.

(4) The shutter blade has a balanced and symmetrical configuration. This configuration results in the minimization of bounce in the moving parts thereof thereby contributing to its long life.

(5) The configuration of the shutter blade lends itself to almost any degree of damping by shims. In this latter connection, shim 54 may be either of the folded or oil filled type to provide desired damping. It has been found that generally one or two shims of approximately .001 inch thickness are satisfactory.

It is to be appreciated that shutter blade 56 can travel a comparatively long distance, a typical distance being ¼ inch. To enable such long travel distances and at the same time maintain optimum flux distribution in the magnetic circuit, the mass of the shutter blade desirably is quite low. Shutter blade 56 preferably consists of an infrared opaque material and, accordingly, may consist of steel about .002 inch thick or of beryllium-copper alloy. As has been stated hereinabove, it is preferably stippled, embossed or flanged to lend it desired stiffness. Its weight can be further reduced by constructing it from a foraminated metal sheet. This will enable a very small weight therefore such as about 0.1 gram.

While there have been shown particular embodiments of this invention it will, of course, be understood that it is not wished to be limited thereto since different modifications may be made both in the circuit arrangements and in the instrumentalities employed, and it is contemplated in the appended claims to cover any such modifications as fall within the true spirit and scope of the invention.

What is claimed as new and desired to be secured by Letters Patent of the United States is:

1. In apparatus for detecting the infrared radiation emitted by journal boxes and including an infrared sensitive element, said infrared sensitive element comprising two like portions which form respective legs of an electrical bridge circuit, one of said portions being shielded from infrared radiation, said infrared sensitive element being contained in a housing having a window compising a materal substantially transparent to infrared radiation and opaque to other radiation in registration with the other portion of said infrared sensitive element, the junction of said portions providing a null signal in the absence of radiation from a journal box and a signal excursion in the presence of said radiation, and means for mounting said infrared sensitive element near the ground adjacent a railroad track and causing it to be aimed so that radiation from above may impinge on the infrared sensitive element; an optical arrangement disposed such that its optical axis intercepts the journal boxes on a moving railroad vehicle for focusing said radiation onto said infrared sensitive element comprising a plurality of lenses substantially transparent to infrared radiation and substantially opaque to other radiation in spaced parallel array, a first of said lenses being disposed to receive the substantially parallel infrared rays emitted from a journal box and to focus them at its focal point, a second lens disposed to receive the diverging radiation from said focal point and to convert it back to parallel rays, a third lens disposed to receive the parallel rays from said second lens and to focus them through said window onto said other portion, high speed shutter means disposed at said focal point so that shutter travel between a first position and a second position is at a minimum allowing for higher shutter speeds, said shutter means being capable of going from said first position to said second position and from said second position to said first position in equally short time durations to permit said radiation from a journal box to be focused through said window onto said other portion only when said shutter means is in said second position and to exclude all radiation other than from said shutter means from said other portion when said shutter means is in said first position, said radiation from said shutter means providing a constant ambient reference radiation for producing said null signal, said second and third lenses being disposed between said shutter means and said infrared sensitive element so that the attenuation of the radiation from a journal box caused by the lenses exceeds the attenuation of the radiation from said shutter means by the amount of attenuation attributed to said first lens, and magnetic pickup means comprising a magnetic circuit having an air gap and responsive to the movement of a railway car wheel toward said gap for producing an electric signal when the side of a journal box associated with said wheel is in a position whereby the radiation therefrom intercepts the optical axis of said optical arrangement, said electric signal having a positive and a negative portion, and means for applying said electric signal to said shutter means to cause said shutter means to be moved rapidly from said one position to said second position during the first portion of said electrical signal so that only radiation from the sides of a passing journal box is permitted to impinge on said infrared sensitive element and to cause said shutter means to be moved rapidly from said second position to said first position during the second portion of said electric signal so that only said reference radiation from such shutter means is permitted to impinge on said infrared sensitive element.

2. In an overheated journal detector including an infrared sensitive element, means for mounting said infrared sensitive element near the ground adjacent a railroad track and causing it to be aimed so that radiation from journal boxes on a railroad vehicle may impinge from above on said infrared sensitive element when focused by an optical arrangement and having optical switch means for interrupting the focusing of said radiation when in a first position and causing a reference source of radiation contained within said detector to be focused on said infrared sensitive element when in said first position, said detector further including wheel pickup means for detecting the presence of a journal box at an optical axis of said optical arrangement and generating a signal proportional to train speed to trigger said optical switch means from said one position to a second position for a period fixed by the duration of said signal wherein the radiation from said journal box is permitted to be focused on said infrared sensitive element by said optical arrangement, the improved optical arrangement comprising a plurality of lenses substantially transparent to infrared radiation and opaque to other radiation arranged so that radiation from the journal box and radiation from said reference source are relatively equally attenuated by said lenses, said optical arrangement including a first lens to receive the substantially parallel rays emitted from a journal box and to focus them at its focal point, a second lens to receive the diverging radiation from said focal point and to convert it back to parallel rays, and a third lens to receive the rays from said second lens and to focus them on said infrared sensitive element, said optical switch means being disposed at the focal point of one of said lenses so that the travel of said optical switch means in going from one of said positions to the other of said positions is minimum, the arrangement of said lenses insuring that the attenuation of the radiation from a journal box caused by the lenses exceeds the attenuation of the radiation from said reference source by the amount of attenuation attributed to said first lens.

3. Improved overheated railroad journal box detection apparatus of the type having an infrared sensitive element mounted near the ground adjacent a railroad track and aimed to receive radiation from journal boxes passing above, said apparatus comprising an optical arrangement disposed such that its optical axis intercepts the journal boxes on a moving railroad vehicle for focusing said radiation onto said infrared sensitive element, said optical arrangement including a plurality of lenses substantially transparent to infrared radiation and opaque to other radiation and a high speed shutter, said shutter being disposed at the focal point of the first of said lenses so that shutter travel between a first position, wherein the radiation from a journal box is permitted to be focused on said infrared sensitive element by said optical arrangement, and a second position, wherein all radiation except that emanating from said shutter is prevented from reaching said infrared sensitive element, is a minimum, said optical arrangement including said first lens to receive the substantially parallel rays emitted from a journal box and to focus them at its focal point, a second lens to receive the diverging radiation from said focal point and to convert it back to parallel rays, and a third lens to receive the rays from said second lens and to focus them on said infrared sensitive element, said second and third lenses forming a parallel array between said shutter and said infrared sensitive element to physically and therefore thermally remove said shutter from said infrared sensitive element, the arrangement of said lenses insuring that the attenuation of the radiation from a journal box caused by the lenses exceeds the attenuation of the radiation from said shutter by the amount of the attenuation attributed to said first lens.

References Cited by the Examiner

UNITED STATES PATENTS

| Re. 24,983 | 5/1961 | Gallagher et al. | 246—169 |
| 1,901,192 | 3/1933 | Reinhardt et al. | |
| 2,028,475 | 1/1936 | Rockwell | 250—83.3 |
| 2,131,328 | 9/1938 | Michelssen. | |
| 2,856,539 | 10/1958 | Orthuber et al. | 246—169 |
| 2,880,309 | 3/1959 | Gallagher et al. | 246—169 |
| 2,931,911 | 4/1960 | Nichols. | |
| 2,973,430 | 2/1961 | Pelino | 246—249 |
| 3,086,108 | 4/1963 | Kaehms | 246—169 |

FOREIGN PATENTS

| 603,961 | 6/1948 | Great Britain. |
| 836,273 | 6/1960 | Great Britain. |

OTHER REFERENCES

Orthuber et al. (II), German application 1,005,876, printed April 4, 1957 (KL 74b).

Schmidt, German application 1,147,407, printed April 18, 1963, (KL 42i).

Article (Abstract SB 43), by Cox et al., appearing on page 1139 in the November 1959 issue (vol. 49, Number II) of "Journal of the Optical Society of America."

ARTHUR L. LA POINT, *Primary Examiner.*

S. T. KRAWCZEWICZ, *Assistant Examiner.*